United States Patent [19]

Thorp

[11] 4,005,728

[45] Feb. 1, 1977

[54] FAUCET VALVE

[75] Inventor: Ralph E. Thorp, Lafayette, Ind.

[73] Assignee: Globe Valve Corporation, Delphi, Ind.

[22] Filed: Aug. 29, 1975

[21] Appl. No.: 608,523

[52] U.S. Cl. .............................. 137/270; 251/172; 251/288; 251/316; 137/454.6

[51] Int. Cl.² .................... F16K 3/10; F16K 25/00

[58] Field of Search .......... 137/270, 625.31, 454.6, 137/625.14; 251/120, 209, 310, 148, 288, 316, 172, 175, 287; 81/121

[56] References Cited

UNITED STATES PATENTS

| | | | |
|---|---|---|---|
| 3,780,758 | 12/1973 | DeVries | 137/454.6 |
| 3,807,455 | 4/1974 | Farrell | 137/454.6 X |
| 3,831,621 | 8/1974 | Anthony et al. | 137/270 |
| 3,913,612 | 10/1975 | Tolnai | 137/454.6 |

Primary Examiner—Martin P. Schwadron
Assistant Examiner—Robert J. Miller
Attorney, Agent, or Firm—Dressler, Goldsmith, Clement, Gordon & Shore, Ltd.

[57] ABSTRACT

A faucet valve to control the volume flow of hot or cold water, such as in a sink fixture, includes a housing having a hollow chamber, a cap removably attached to said housing and defining a passage offset from the axis of the chamber, and a stem rotatably disposed within the housing and having an inlet passage offset from the axis of rotation of the stem. A resilient grommet seal is disposed in the passage in the cap and is in sliding sealing engagement with the stem. The cap can be removed from the housing to replace the grommet, or to reverse the direction of rotation of the stem member between the open and closed positions, whereby the faucet valve can be interchangeably used in the hot or cold water lines of a sink fixture.

14 Claims, 10 Drawing Figures

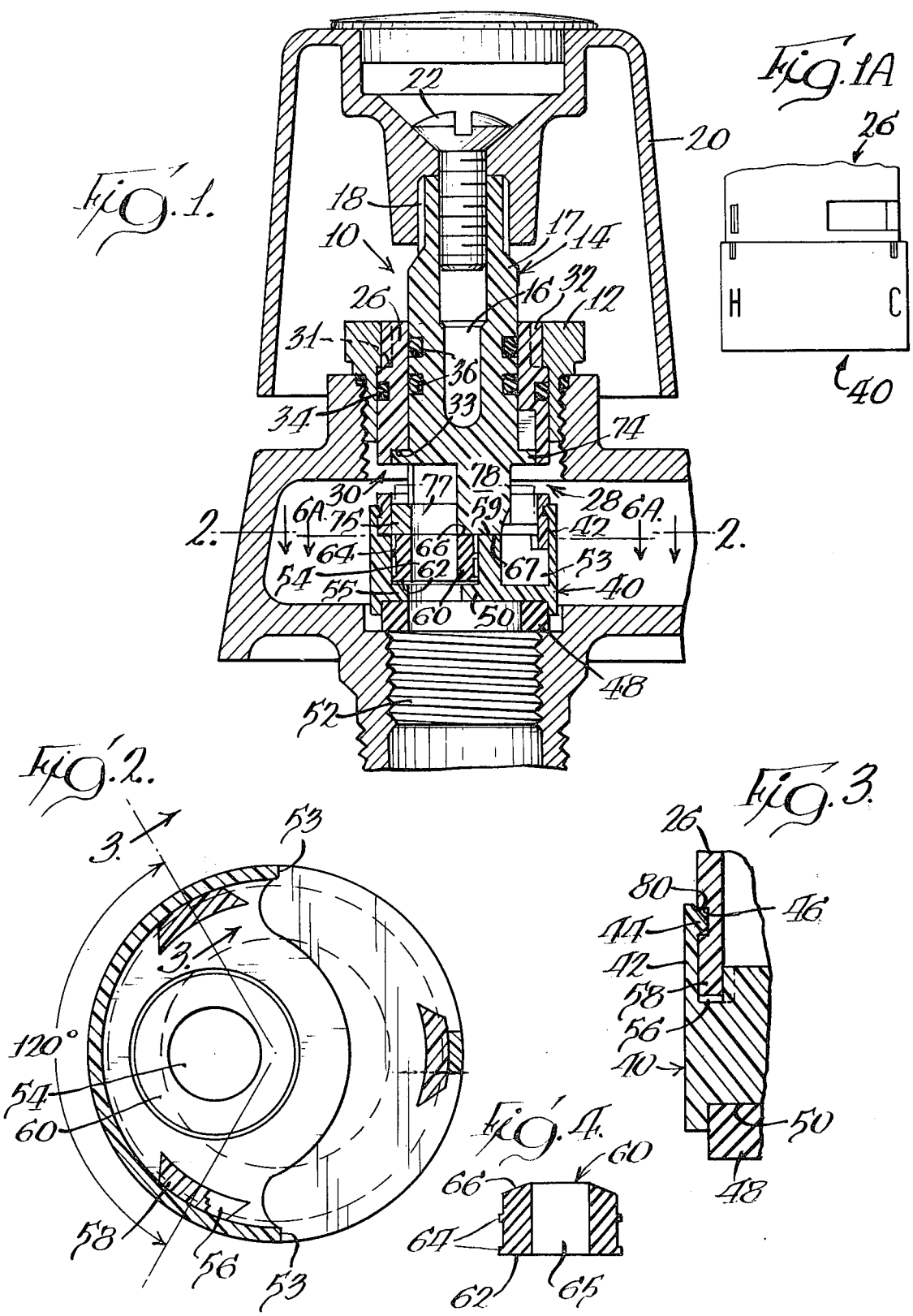

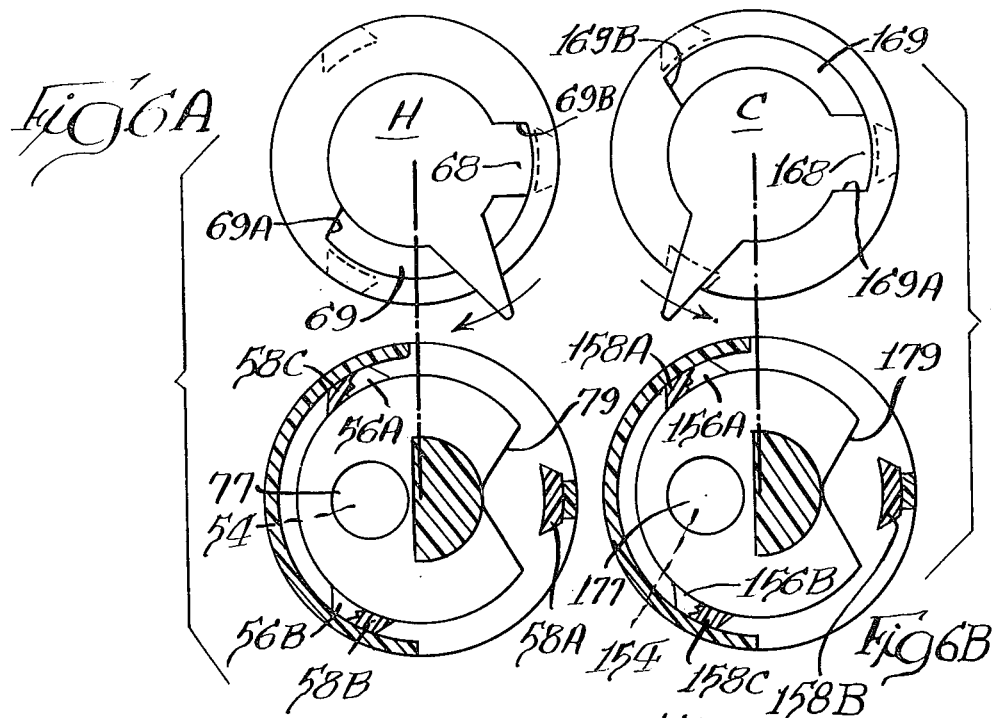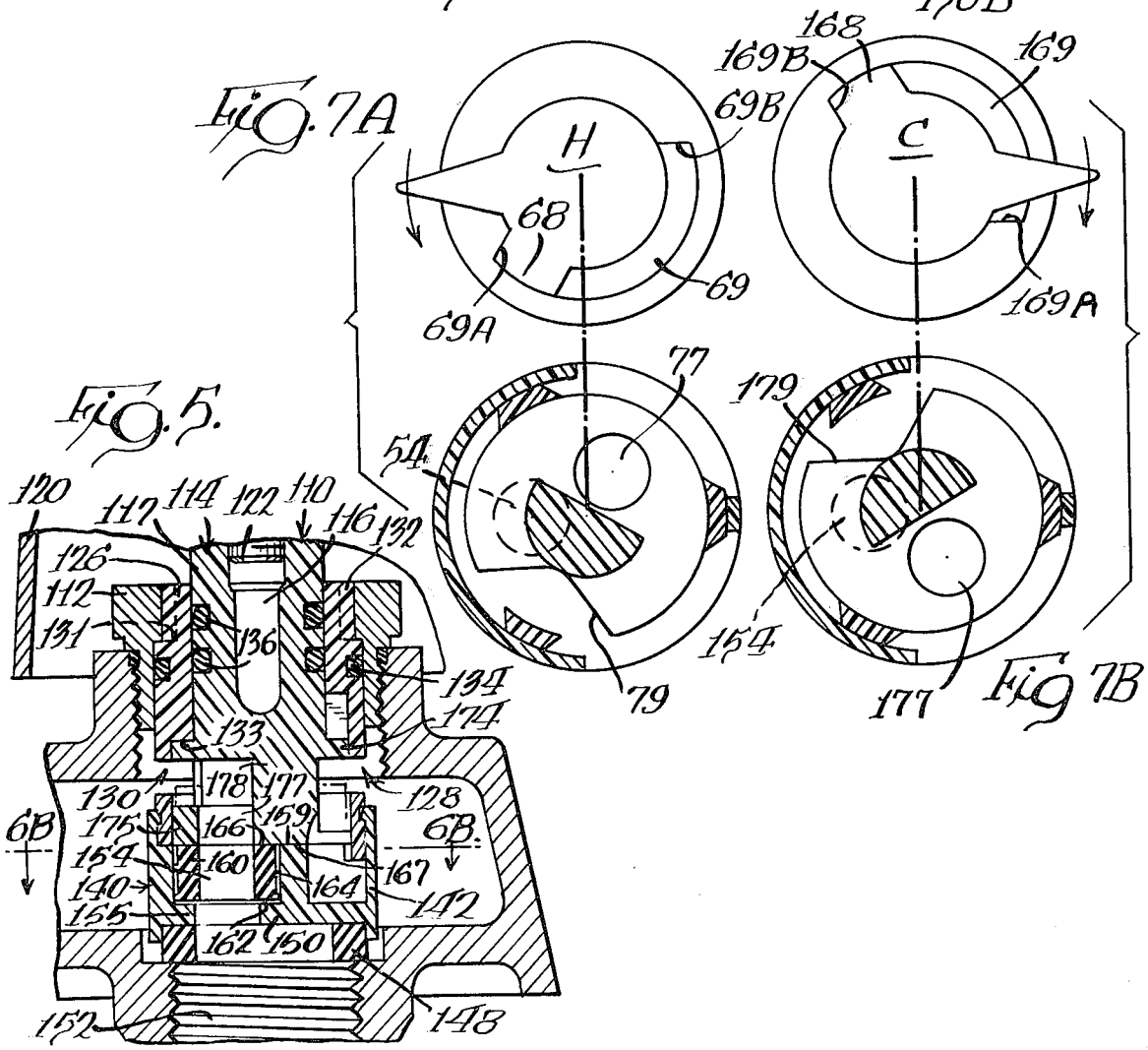

FAUCET VALVE

BACKGROUND OF THE INVENTION

This invention relates to a faucet valve, and more particularly, to faucet valves suitable for use in sinks, lavatories, bath tubs, showers and other plumbing applications wherein separate faucet valves are provided for the hot and cold water lines and the valves discharge into a common spout, and for single valves for either hot or cold water. Faucet valves of this type include at least two members which are rotatable with respect to one another and which have passages therein that can be brought variably and progressively into and out of registration to control the rate of flow of fluid through the valve. A seal means is provided in the passage of one of the members to prevent leakage.

Patents such as U.S. Pat. No. 3,645,493 to Manoogian et al. and U.S. Pat. No. 3,677,516 to Hicks typify the prior art and disclose a seal means disposed in a passage in a first member, and a spring which continuously urges the seal means against a second member. A disadvantage to the use of a spring or any other secondary supplementary device to urge the seal means against a valve member is the possibility of spring failure due to corrosion of the spring, electrolysis, or various other causes. Other disadvantages of the prior art are the difficulty of replacing a worn seal means and the inability to interchangeably use the faucet valve selectively in either the hot or cold water line.

SUMMARY OF THE INVENTION

A faucet valve embodying the present invention is operative to control the volume flow of water in the hot or cold water lines, such as in a sink fixture, as desired. The faucet valve includes a hollow housing having two outlet ports, a cap member which is removably attached to the housing and defines a passage offset from the axis of the chamber, and a stem rotatably disposed within the housing and having an inlet passage offset from the axis of rotation of the stem. The cap has an inwardly directed shoulder defining a reduced diameter portion at one end of the passage through the cap, and a resilient grommet seal is disposed in the passage in the cap in a compressed condition. One end of the grommet is in sliding sealing engagement with the stem, and the outer surface of the grommet is in sealing engagement with the cap. The housing, cap member and grommet form a fixed assembly with the stem member disposed rotatably within the fixed assembly. Stop means is provided to limit relative rotation between the stem member and the fixed assembly between a closed position wherein the passage in the cap member is not in registry with the passage in the stem member, and an open position wherein the passages in the cap member and stem member are in full registry.

The cap member is formed of plastic or another suitable resilient material which provides the cap member with sufficient flexibility to be removed from the housing and then be snap-fit back onto the housing. Thus, the cap member can easily be removed from the housing to replace a worn grommet.

Inasmuch as it is common at least in the United States for the cold water valve to be rotated clockwise to the on position, and the hot water valve to be rotated counterclockwise to the on position, prior art individual control valves were made with mirror image non-interchangeable parts. According to a further feature of the present invention, however, the direction of rotation of the stem member with respect to the housing between the open and closed positions can be reversed by removing the cap member from the housing, rotating the cap member about 120° and then reassembling the cap member back onto the housing, whereby the faucet valve can be interchangeably used in either the hot or cold water lines of a fixture. To facilitate in determining whether an assembled valve is for use on the hot or cold water line, the cap may be provided with H and C markings, representing the hot and cold positions, which can be aligned with a reference line on the housing.

The removable cap enables a plumber in the field to easily replace a worn grommet or o-ring on the stem, and the interchangeable feature enables the plumber to carry fewer parts with him to service calls.

BRIEF DESCRIPTION OF THE DRAWINGS

FIG. 1 is a cross-sectional view of the faucet valve of the present invention in position in the hot water line of a sink fixture in the open position;

FIG. 1A is an elevational view of the faucet valve in the hot water line and showing the indicia thereon.

FIG. 2 is a cross-sectional view, partly broken away, taken along plane 2—2 in FIG. 1;

FIG. 3 is a fragmentary cross-sectional view taken along plane 3—3 in FIG. 2;

FIG. 4 is a cross-sectional view of the grommet in a relaxed condition;

FIG. 5 is a cross-sectional view, similar to FIG. 1, of the faucet valve of the present invention positioned in the cold water line of a sink fixture in the open position;

FIG. 6a shows in the lower illustration a cross-sectional view taken along plane 6A—6A in FIG. 1 and in the upper illustration a schematic view of the stop means on the stem, both illustrations showing the faucet valve in the open position;

FIG. 6B shows in the lower illustration a cross-sectional view taken along plane 6B—6B in FIG. 5, and in the upper illustration a schematic view of the stop means on the stem, both illustrations showing the faucet valve in the open position;

FIG. 7A shows in the lower illustration a cross-sectional view similar to FIG. 6A, and in the upper illustration a schematic view of the stop means on the stem, both illustrations showing the faucet valve of FIG. 6A in the closed position; and FIG. 7B shows in the lower illustration a cross-sectional view similar to FIG. 6B and in the upper illustration a schematic view of the stop means on the stem, both showing the faucet valve of FIGS. 5 and 6B in the closed position.

DETAILED DESCRIPTION OF THE PREFERRED EMBODIMENT

In the following description, two digit numerals are used to refer to the faucet valve illustrated in FIGS. 1–4, 6A and 7A which is suitable for use in the hot water passage of a sink fixture, and three digit numerals in the 100 series are used to refer to the faucet valve illustrated in FIGS. 5, 6B and 7B in which parts have been repositioned whereby the faucet valve is suitable for use in the cold water passage of a sink fixture, the same last two digits in each numeral designating similar elements in the faucet valves.

Referring now to the drawings, the faucet valve 10 illustrated in FIG. 1 is of a type that could be used in plumbing fittings such as in a sink fixture and includes an externally threaded fitting or brass bonnet 12 which can be connected in a conventional manner to either the hot or cold water line.

The faucet valve 10 includes a stem 14 which can be made of plastic or other suitable material and has a cylindrical bore 16 through an upper portion of the stem. The stem has an upper portion 17 of reduced diameter, the upper end of which comprises a male broach having a plurality of longitudinally extending external ribs 18 defining grooves therebetween. A control handle 20 is secured to the upper end of the stem 14 by a screw 22 which is received in the bore 16. The control handle 20 has a female broach comprising a plurality of longitudinally extending ribs defining grooves therebetween, the ribs and grooves in the handle being receivable in the grooves and ribs 18 in the stem 14 to prevent relative rotation between the control handle 20 and the stem 14.

The stem 14 is rotatably disposed within a housing 26 which has a cylindrical hollow chamber therein in which the stem 14 is disposed. The sidewall of the housing 26 defines a first outlet port 28, and in the illustrated embodiment also defines a second outlet port 30. The housing 26 fits within the bonnet 12, has an upper shoulder 31 along the outside wall to limit axial movement of the bonnet with respect to the housing, and has a plurality of longitudinally extending ribs 32 along the upper portion thereof which are received in longitudinally extending complementary grooves in the bonnet 12 to prevent rotational movement of the bonnet with respect to the housing. An inwardly directed shoulder 33 in the housing 26 engages the reduced diameter portion 17 of the stem 14 to restrict upward movement of the stem in a direction axially parallel to the chamber in the stem, thereby limiting the stem substantially to rotational movement with respect to the housing. An o-ring 34 is positioned in an annular groove in the housing 26 to form a seal between the housing 26 and the bonnet 12, and o-rings 36 are positioned in annular grooves in the stem to form a seal between the stem 14 and the housing 26.

A cap 40, which can be formed of plastic is concentric with and removably attached to the housing 26. As shown in FIGS. 1 and 3, the sidewall 42 of the cap 40 has an inwardly directed annular rib 44 along the upper end thereof which is receivable in an annular groove 46 in the housing 26 so that the cap can be snap-fit onto the housing. To enable the cap 40 to be snap-fit to the housing 26 and to be removed therefrom, it is desirable to have the cap 40 formed of an appropriate plastic or another suitable resilient material to provide the cap with the necessary flexibility. An annular seal 48 is disposed within the sidewall 42 of the cap along a lower portion of the sidewall below the bottom wall 50 of the cap 40 and forms a seal between the cap 40 and the water pipe 52 to which the faucet valve is connected.

The sidewall 42 of the cap preferably defines at least one opening 53 (FIGS. 1 and 2), the significance of which is discussed hereinbelow. Referring to FIGS. 1 and 2, the cap 40 defines a passage 54 which is offset from the axis of the chamber in the housing 26, the passage 54 also extending through the bottom wall 50 of the cap. The cap 40 has a shoulder 55 which defines a reduced diameter portion of the passage 54 through the bottom wall 50 of the cap. As shown in FIG. 2, the cap 40 has a pair of notches 56 which receive downwardly extending locator lugs 58 on housing 26 to prevent rotational movement of the cap 40 with respect to the housing 26.

Before the cap 40 is snapped onto the housing 26, a seal means such as a resilient rubber grommet seal 60 illustrated in FIG. 4, is inserted into the passage 54 in the cap 40 until the bottom wall 62 of the grommet rests against the bottom wall of the cap. The grommet 60 further includes a plurality of outwardly projecting annular o-ring sections or flanges 64 and a tapered top wall 66. When the cap 40 is snap-fit onto the housing 26, the grommet is in a slightly compressed condition with the bottom wall 62 of the grommet in sealing engagement with the bottom wall 50 of the cap, the flanges 64 in sealing engagement with the wall of cap 40 which defines the passage 54, and the top wall 66 is continuously urged against and in sliding sealing engagement with the bottom surface 67 of the stem 14. The grommet 60 defines a generally cylindrical passage 65 between the top wall 66 and the bottom wall 62.

The diameter of the passage 54 through the bottom wall 50 of the cap 40 is greater than the inner diameter of the grommet 60, which results in hydraulic pressure acting against the bottom surface 62 of the grommet to further urge the grommet into a floating seal with the cap 40 and the stem 14. The grommet initially engages the bottom wall 50 of the cap 40, but the hydraulic pressure is exerted over the entire bottom surface 62 of the grommet which results in the grommet being spaced apart from the bottom wall 50, as shown in FIGS. 1 and 5. The grommet thereby forms a seal between the stem 14 and the cap 40 without the use of a spring or other extraneous element.

When the cap 40 is fixed in position on the housing 26, the upper surface 59 of the cap is in face-to-face relation with the bottom surface 67 of the stem 14 to restrict downward movement of the stem in a direction axially parallel to the stem and the chamber in the housing.

The stem 14, which is rotatably disposed within the housing 26, has a stop means which comprises an outwardly directed projection 68 (FIGS. 6A, 6B, 7A and 7B) which fits into a recess 69 in the housing 26, thereby limiting the rotation of the stem with respect to the housing 26. The recess 69 has a first shoulder 69A at one end of the recess and a second shoulder 69B at the opposite end of the recess. The stem has a partition wall 74 transversely positioned with respect to the longitudinal dimension of the faucet valve, a generally cylindrical segment 75 having the bottom surface 67 and an inlet passage 77 extending through the cylindrical segment 75 and which passage is offset from the axis of rotation of the stem 14, a relatively flat bottom wall 67, and a reduced diameter semi-circular shaped segment 78 which connects the cylindrical segment 75 to the partition wall 74. The cylindrical segment 75 also defines a passage 79 (FIGS. 6A, 6B, 7A, 7B) extending therethrough. The passage 79 is positioned with respect to the inlet passage 77 and the stop means so that the passage 79 will not be positioned in registry with the passage 54 in the cap when the stem 14 is rotated. The reduced diameter segment 78 of the stem 14 defines a discharge passage which communicates with the inlet passage 77, passage 79, and with the first and second outlet ports 28 and 30 in the housing 26. The diameter of the inlet passage 77 is preferably about equal to the diameter of the passage 65 in the grommet 60.

When the faucet valve 10 is in the off position illustrated in FIG. 7A, the projection 68 on the stem 14 abuts shoulder 69A and can only be moved in the counterclockwise direction. In this position, the inlet passage 77 through the cylindrical segment 75 of the stem 14 is out of registry with the passage 54 through the cap 40. The hot water faucet valve 10 is moved from the closed (off) position of FIG. 7A to the open (on) position of FIG. 6A by rotating the control handle 20 and the stem 14 in the counterclockwise direction with respect to the housing 26 and cap 40 until the projection 68 on the stem 14 abuts the shoulder 69B. In this position, the inlet passage 77 of the stem 14 and the passage 54 through the cap 40 are in registry. The water flowing through the pipe 52 enters the faucet valve 10 by passing through passage 54 and inlet passage 77 to the discharge passage adjacent the reduced diameter segment 78 of the stem 14, and exits the faucet valve through the outlet ports 28 and 30 in the housing 26. The passage 79 in the stem 14 enables some of the water in the discharge passage adjacent the reduced diameter segment 78 to enter the cap 40 and exit the faucet valve through openings 53 in the cap. Water will exit through the openings 53 in the cap only when the inlet passage 77 is in registry with passage 54. The faucet valve 10 can be moved from the open position illustrated in FIG. 6A to the closed position of FIG. 7A by rotating the stem 14 in the clockwise direction. The rate of flow of water through the faucet valve 10 is varied by positioning the inlet passage 77 in varying degrees of partial registration with the passage 54.

It is a feature of the present invention that the cap 40 can be readily detached from the housing 26 by hand without the use of tools and can be replaced thereon. As shown in FIG. 3, the rib 44 has a tapered wall 80 which facilitates in snapping the cap 40 on the housing 46. When the cap is removed from the remainder of the faucet valve, it is easy to remove the grommet 60 from the cap, as when a worn grommet requires replacement.

With the present invention, the orientation of the cap 40 can be changed so that the faucet valve 10 can be interchangeably used to control the flow of water through either the hot or cold water line. Thus, the housing 26 can be provided with three locator lugs 58A, 58B and 58C (FIGS. 6A and 6B) uniformly spaced about 120° apart, and the cap 40 can be provided with two notches 56A and 56B which are similarly positioned about 120° apart.

As shown in FIGS. 6A and 7A, the faucet valve 10 is suitable for use to control the flow of hot water through pipe 52. Referring particularly to FIGS. 7A and 7B, the cap 40 on faucet valve 10 which controls the flow of hot water can be rotated about 120° in the clockwise direction and snapped back onto the housing 26 to create a faucet valve 110 which is suitable for use to control the flow of cold water through pipe 152. Likewise, the cap 140 on faucet valve 110 can be removed, rotated 120° in the counterclockwise direction, and repositioned on the housing 126 to create a faucet valve 10 suitable for use to control the flow of hot water through pipe 52. When the faucet valve 110 is in the closed (off) position illustrated in FIG. 7B, the projection 168 abuts shoulder 169B and the stem 114 can only be rotated in the clockwise direction. By rotating the stem 114 in the clockwise direction until the projection 168 abuts the shoulder 169A, the faucet valve 110 is moved from the closed position (FIG. 7B) wherein the passage 154 in the cap 140 is not in registration with the inlet passage 177 in the stem 114, to the open (on) position (FIG. 6B) wherein the passage 154 is in registration with the inlet passage 177. Similarly, the stem 114 can be rotated counterclockwise to move the faucet valve from the open position to the closed position.

As shown in FIG. 1A, the cap preferably is provided with indicia to indicate to a plumber the setting of the faucet valve assembly, e.g., whether the faucet valve is assembled for use in a hot water line or in a cold water line. Thus, the plumber can tell whether the cap should be removed, rotated and reassembled before being installed in the water line. For example, the cap can be provided with H and C markings which represent the hot and cold positions. The markings can be oriented with a reference line 99 on the housing to determine the position of the faucet valve assembly. The markings also indicate the direction in which the stem member is rotatable to move the faucet valve between the closed and open positions.

While this invention is susceptible of embodiment in many different forms, there is shown in the drawings and described herein in detail a preferred embodiment of the invention, with the understanding that the present disclosure is to be considered as an exemplification of the principles of the invention and is not intended to limit the invention to the embodiment illustrated.

I claim:
1. A faucet valve to control the volume flow of fluid, comprising:
 a housing having a cylindrical hollow chamber therein and having an outlet port,
 a cap member concentric with and removably attached directly to said housing and defining a passage offset from the axis of said chamber,
 a stem member rotatably disposed within said housing and having an inlet passage offset from the axis of rotation of said stem member and a discharge passage communicating with said inlet passage and with said outlet port, said stem member upon rotation thereof having its inlet passage moved between a closed position out of registry with said passage in said cap member and an open position is registry with said passage in said cap member to vary the rate of flow of fluid through the faucet, said stem member having a flat bottom surface,
 a resilient grommet seal disposed in said passage in said cap member and which is continuously urged against and in sliding sealing engagement with said bottom surface of said stem member, and
 sealing means between said stem member and housing,
 said cap member being removable from said housing to provide access to said grommet.
2. A faucet valve as defined in claim 1 wherein:
 said cap has a shoulder which defines a reduced diameter portion at one end of said passage, said grommet has an outer surface in sealing engagement with said shoulder, one end which is in sliding sealing engagement with the bottom surface of said stem member, and defines a generally cylindrical passage between said one end and the opposite end thereof, said passage through said reduced diameter portion of said cap has a greater diameter than said passage through said grommet, and said passage in said grommet has a diameter about equal to the diameter of said inlet passage in said stem, whereby said fluid acts on said grommet to urge said grommet against said stem and said cap.

3. A faucet valve as defined in claim 2 wherein said grommet has a plurality of outwardly directed annular flanges in sealing engagement with said cap member.

4. A faucet valve as defined in claim 1 wherein said housing has an annular groove, and said cap member has a sidewall which is concentric with said groove and has an inwardly directed annular rib along one end thereof, said rib being receivable in said groove in said housing.

5. A faucet valve as defined in claim 1 wherein said stem member has a reduced diameter portion and said housing has an inwardly directed shoulder engaging the reduced diameter portion of said stem member to restrict upward movement of the stem member in a direction axially parallel to said chamber, thereby limiting the stem member substantially to rotational movement.

6. A faucet valve as defined in claim 1 wherein:
said housing has an annular groove,
said cap member has a sidewall which is concentric with said groove and has an inwardly directed annular rib along one end thereof, said rib being receivable in said groove in said housing to fix the cap member in position on said housing with said cap member in face-to-face relation with said bottom surface of said stem member to restrict downward movement of the stem member in a direction axially parallel to said chamber,
said stem member has a reduced diameter portion, and
said housing has an inwardly directed shoulder engaging the reduced diameter portion of said stem member to restrict upward movement of the stem member in a direction axially parallel to said chamber, thereby limiting the stem member substantially to rotational movement.

7. A faucet valve as defined in claim 1 wherein said housing, cap member and grommet form a fixed assembly, said stem member is rotatable with respect to said fixed assembly and stop means is provided to limit relative rotation between said stem member and said fixed assembly between said closed position and said open position.

8. A faucet valve as defined in claim 1 wherein:
stop means is provided in said housing to limit relative rotation between said stem member and said cap member and housing between said closed position and said open position,
said cap member is disposed in a first position on said housing,
said stem member is rotatable in a first direction to move from said closed position to said open position and in a second direction to move from said open position to said closed position, and
indicia means is provided for indicating the direction in which said stem member is rotatable to move between said closed and open positions,
said cap member being repositionable from a first position on said housing to a second position on said housing which is disposed at an angle with respect to said first position wherein said stem member is rotatable in said second direction to move from said closed position to said open position and in said first direction to move from said open position to said closed position,
whereby repositioning of said cap member enables said faucet valve to the interchangeably used on a faucet for either direction of movement between said closed and open positions.

9. A faucet valve to control the volume flow of fluid, comprising:
a housing having a cylindrical hollow chamber therein and having an outlet port,
a cap member concentric with and removably attached to said housing and defining a passage offset from the axis of said chamber, said cap member being disposed in a first position on said housing,
a stem member rotatably disposed within said housing and having an inlet passage offset from the axis of rotation of said stem member and a discharge passage communicating with said inlet passage and with said outlet port, said stem member upon rotation thereof having its inlet passage moved between a closed position out of registry with said passage in said cap member and an open position in registry with said passage in said cap member to vary the rate of flow of fluid through the faucet, said stem member being rotatable in a first direction to move from said closed position to said open position and in a second direction to move from said open position to said closed position, said stem member having a flat bottom surface which is in face-to-face relation with one end of said cap member,
stop means being provided in said housing to limit relative rotation between said stem member and said cap member and housing between said closed position and said open position,
said cap member being repositionable from said first position on said housing to a second position on said housing which is disposed at an angle with respect to said first position wherein said stem member is rotatable in said second direction to move from said closed position to said open position and in said first direction to move from said open position to said closed position, whereby repositioning of said cap member enables said faucet valve to be interchangeably used on a faucet for either direction of movement between said closed and open positions,
indicia means being provided for indicating the direction in which said stem member is rotatable to move between said closed and open positions,
seal means in said passage in said cap member and which is continuously urged against and in sliding sealing engagement with said bottom surface of said stem member and which sealingly engages said housing.

10. A faucet valve as defined in claim 9, wherein:
said housing has an annular groove,
said cap member has a sidewall which is concentric with said groove and has an inwardly directed annular rib along one end thereof, said rib being receivable in said groove in said housing to fix the cap member in position on said housing with said cap member in face-to-face relation with said bottom surface of said stem member to restrict downward movement of the stem member in a direction axially parallel to said chamber,
said stem member has a reduced diameter portion, and
said housing has an inwardly directed shoulder engaging the reduced diameter portion of said stem member to restrict upward movement of the stem member in a direction axially parallel to said chamber, thereby limiting the stem member substantially to rotational movement.

11. A faucet valve as defined in claim 9 wherein:
said cap has an inwardly directed shoulder which defines a reduced diameter portion at one end of said passage, said seal means comprises a resilient grommet seal disposed in said passage in said cap member, said grommet having an outer surface in sealing engagement with said shoulder, one end which is in sliding sealing engagement with the bottom surface of said stem member, and defines a generally cylindrical passage between said one end and the opposite end thereof, and said passage in said grommet has a diameter about equal to the diameter of said inlet passage in said stem and less than the diameter of said passage through said reduced diameter portion of said cap, whereby said fluid urges said grommet against said stem and said cap.

12. A faucet valve as defined in claim 11 wherein said grommet has a plurality of outwardly directed annular flanges in sealing engagement with said cap member.

13. A faucet valve to control the volume flow of fluid comprising:
a housing having a cylindrical hollow chamber therein and having an outlet port,
a cap member concentric with and removably attached to said housing and defining a passage offset from the axis of said chamber, said cap member being disposed in a first position on said housing,
a stem member rotatably disposed within said housing and having an inlet passage offset from the axis of rotation of said stem member and a discharge passage communicating with said inlet passage and with said outlet port, said stem member upon rotation thereof having its inlet passage moved between a closed position out of registry with said passage in said cap member and an open position in registry with said passage in said cap member to vary the rate of flow of fluid through the faucet, said stem member being rotatable in a first direction to move from said closed position to said open position and in a second direction to move from said open position to said closed position, said stem member having a flat bottom surface which is in face-to-face relation with one end of said cap member, said cap member being repositionable from said first position on said housing to a second position on said housing which is disposed at an angle with respect to said first position wherein said stem member is rotatable in said second direction to move from said closed position to said open position and in said first direction to move from said open position to said closed position, whereby repositioning of said cap member enables said faucet valve to be interchangeably used on a faucet for either direction of movement between said closed and open positions, seal means in said passage in said cap member and which is continuously urged against and in sliding sealing engagement with said bottom surface of said stem member and which sealingly engages said housing.

14. A faucet valve to control the volume flow of fluid, comprising:
a housing having a cylindrical hollow chamber therein and having an outlet port,
a cap member concentric with and removably attached to said housing and defining a passage offset from the axis of said chamber,
a stem member rotatably disposed within said housing and having an inlet passage offset from the axis of rotation of said stem member and a discharge passage communicating with said inlet passage and with said outlet port, said stem member upon rotation thereof having its inlet passage moved between a closed position out of registry with said passage in said cap member and an open position in registry with said passage in said cap member to vary the rate of flow of fluid through the faucet, said stem member having a flat bottom surface,
a resilient grommet seal disposed in said passage in said cap member and defining a passage, and
sealing means between said stem member and said housing,
the diameter of said passage through said cap member being greater than the diameter of said passage through said grommet, said grommet being continuously urged against and in sliding sealing engagement with said bottom surface of said stem member, and said grommet having a bottom surface against which hydraulic pressure of said liquid acts to urge said grommet into a floating seal with said cap member and said stem member.

* * * * *